(12) United States Patent
Whitton

(10) Patent No.: US 7,643,925 B2
(45) Date of Patent: Jan. 5, 2010

(54) AUTOMATIC TRANSMISSION CLUTCH TIMING OPTIMIZATION APPARATUS AND METHOD

(75) Inventor: Matthew D. Whitton, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1018 days.

(21) Appl. No.: 10/808,081

(22) Filed: Mar. 24, 2004

(65) Prior Publication Data

US 2005/0216159 A1    Sep. 29, 2005

(51) Int. Cl.
*G06F 7/00* (2006.01)
*H02P 1/00* (2006.01)
*H02P 15/00* (2006.01)

(52) U.S. Cl. ............... 701/67; 701/51; 701/52; 701/53; 701/54; 701/57; 477/7; 477/8; 477/15; 477/30; 477/31; 474/70

(58) Field of Classification Search ................. None
See application file for complete search history.

(56) References Cited

U.S. PATENT DOCUMENTS

| | | | |
|---|---|---|---|
| 4,070,927 A | 1/1978 | Polak | 475/286 |
| 5,072,390 A | 12/1991 | Lentz et al. | 364/424.1 |
| 5,241,477 A * | 8/1993 | Narita | 701/59 |
| 5,304,102 A * | 4/1994 | Narita et al. | 475/125 |
| 5,580,332 A | 12/1996 | Mitchell et al. | 477/143 |
| 5,601,506 A | 2/1997 | Long et al. | 475/120 |
| 5,745,382 A * | 4/1998 | Vilim et al. | 706/16 |
| 5,779,594 A * | 7/1998 | Minowa et al. | 477/156 |
| 6,216,066 B1 * | 4/2001 | Goebel et al. | 701/29 |
| 6,243,637 B1 * | 6/2001 | Minowa et al. | 701/51 |
| 6,285,942 B1 | 9/2001 | Steinmetz et al. | 701/67 |
| 6,292,732 B1 | 9/2001 | Steinmetz et al. | 701/67 |
| 6,319,172 B1 | 11/2001 | Steinmetz et al. | 477/143 |
| 6,334,833 B1 * | 1/2002 | Ochi et al. | 477/143 |
| 6,374,170 B1 | 4/2002 | Kresse et al. | 701/51 |
| 6,428,440 B2 * | 8/2002 | Yuasa et al. | 475/125 |
| 6,480,777 B1 | 11/2002 | Sato et al. | 701/60 |
| 6,503,165 B1 * | 1/2003 | Kubo et al. | 475/125 |
| 6,961,646 B2 * | 11/2005 | Soliman et al. | 701/51 |
| 2001/0016539 A1 * | 8/2001 | Yuasa et al. | 477/143 |

OTHER PUBLICATIONS

Time Derivative—Non Patent Literature.*

* cited by examiner

*Primary Examiner*—Khoi Tran
*Assistant Examiner*—Ian Jen

(57) ABSTRACT

A method for determining when in the course of a shift event an on-coming clutch gains torque capacity is provided. The method includes closed-loop controlling an off-going clutch to maintain a predetermined slip threshold by generating an off-going clutch pressure command, causing the on-coming clutch to engage during the closed loop control of the off-going clutch, generating a first derivative with respect to time of the off-going clutch pressure command, and using the first derivative to determine when the on-coming clutch gained torque capacity. A neural network method is preferably employed in analyzing the first derivative to locate a transition in the rate of commanded pressure indicative of off-going clutch release. A corresponding apparatus is also provided.

11 Claims, 3 Drawing Sheets

| | CLUTCH | | | | |
|---|---|---|---|---|---|
| RANGE | C1 | C2 | C3 | C4 | C5 |
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

| LOCAL MIN/MAX | TIME (mS) | 1st DERIVATIVE (KPa/sec) | VOLUME REMAINING (cc) | GROUP |
|---|---|---|---|---|
| 108A | 800 | -450 | 50 | 1 |
| 108B | 920 | 10 | 45 | 1 |
| 108C | 980 | -400 | 34 | 1 |
| 108D | 1020 | 20 | 27 | 1 |
| 108E | 1035 | -180 | 19 | 1 |
| 108F | 1105 | 650 | 12 | 1 |
| 108G | 1140 | 500 | 4 | 1 |
| 108H | 1170 | 625 | -3 | 1 |
| 108I | 1205 | -800 | -10 | 2 |
| 108J | 1380 | -690 | -20 | 2 |
| 108K | 1405 | -720 |  | 2 |
| 108L | 1450 | -700 |  | 2 |
| 108M | 1500 | -730 |  | 2 |
| 108N | 1550 | -700 |  | 2 |
| 108P | 1585 | -750 |  | 2 |
| 108Q | 1595 | -690 |  | 2 |
| 108R | 1615 | -720 |  | 2 |

AUTOMATIC TRANSMISSION CLUTCH TIMING OPTIMIZATION APPARATUS AND METHOD

TECHNICAL FIELD

This invention relates to automatic vehicle transmissions that are characterized by closed-loop control of an off-going clutch pressure command to maintain a predetermined slip threshold, and that exploit data from the first and second derivatives of the off-going clutch pressure command to determine when an on-coming clutch gains torque capacity.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is typically coupled to the vehicle engine through a fluid coupling such as a torque converter, and the output shaft is coupled to the vehicle drive wheels through a differential gear set.

Shifting from a currently established speed ratio to a new speed ratio involves, in most cases, disengaging a clutch (off-going clutch) associated with the current speed ratio and engaging a clutch (on-coming clutch) associated with the new speed ratio. Each such shift includes a fill or preparation phase during which an apply chamber of the on-coming clutch is filled in preparation for torque transmission. Once filled, the on-coming clutch transmits torque in relation to the clutch pressure, and the shift can be completed using various control strategies.

In a clutch-to-clutch transmission, disengagement of the off-going clutch and engagement of the on-coming clutch is accomplished by a transmission controller transmitting pressure commands to alter the pressure and fluid volume in the respective apply chambers. The transmission controller must take into account such variables as the volume of fluid necessary to fill each clutch's respective apply chamber, fluid flow rates, fluid temperature, etc., in generating the pressure commands to ensure proper timing of the clutches. If an on-coming clutch gains torque capacity prior to disengagement of the off-going clutch, then transmission tie-up may occur. If an on-coming clutch gains torque capacity too long after the off-going clutch disengages, then engine flare will occur.

The prior art includes clutch-to-clutch transmissions that employ closed loop control of the off-going clutch during a shift event such that the off-going clutch maintains a predetermined slip threshold. As the on-coming clutch gains torque capacity, the speed of the input shaft drops. The transmission controller, as a result of the closed loop control of the off-going clutch, will compensate by reducing the pressure command for the off-going clutch as the on-coming clutch gains capacity until the off-going clutch torque capacity is zero.

SUMMARY OF THE INVENTION

A method and apparatus for use with an automatic transmission having an off-going clutch and an on-coming clutch during a speed ratio shift event is provided. The method enables accurate determination during vehicle operation of when, in the course of a shift event, an on-coming clutch gains torque capacity. The method includes controlling the off-going clutch using closed loop control to maintain a predetermined slip threshold. Controlling the off-going clutch includes generating an off-going clutch pressure command to which the off-going clutch is responsive and that varies with respect to time. The method also includes causing the on-coming clutch to gain torque capacity while controlling the off-going clutch, determining the first derivative with respect to time of the off-going clutch pressure command, and determining when the on-coming clutch gained torque capacity using the first derivative.

In the preferred embodiment, a k-means neural network algorithm is employed in determining when the on-coming clutch gains torque capacity. More specifically, the method preferably includes generating a set of data points corresponding to local minima and local maxima of the first derivative. Each of the data points includes a time value and a first derivative value (i.e., the rate of change of the commanded pressure in the off-going clutch apply chamber) for one of the local minima or maxima. The method also preferably includes using a k-means algorithm to classify each of the data points into one of a first group and a second group, the data points in the second group having later time values than the data points in the first group, and determining the data point having the earliest time value in the second group.

The ability to determine, during vehicle operation, when in the course of a shift event the on-coming clutch gains torque capacity enables a transmission controller to determine the accuracy of the variables and calculations employed in generating pressure commands and to make appropriate adjustments as necessary to optimize the timing of the on-coming clutch.

A corresponding apparatus is also provided.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENT

The control of this invention is described in the context of a multi-ratio power transmission having a planetary gear set of the type described in the U.S. Pat. No. 4,070,927 to Polak, and having an electro-hydraulic control of the type described in U.S. Pat. No. 5,601,506 to Long et al, both of which are hereby incorporated by reference in their entireties. Accordingly, the gear set and control elements shown in FIG. 1 hereof have been greatly simplified, it being understood that further information regarding the fluid pressure routings and so on may be found in the aforementioned patents.

Figures 1, 2:
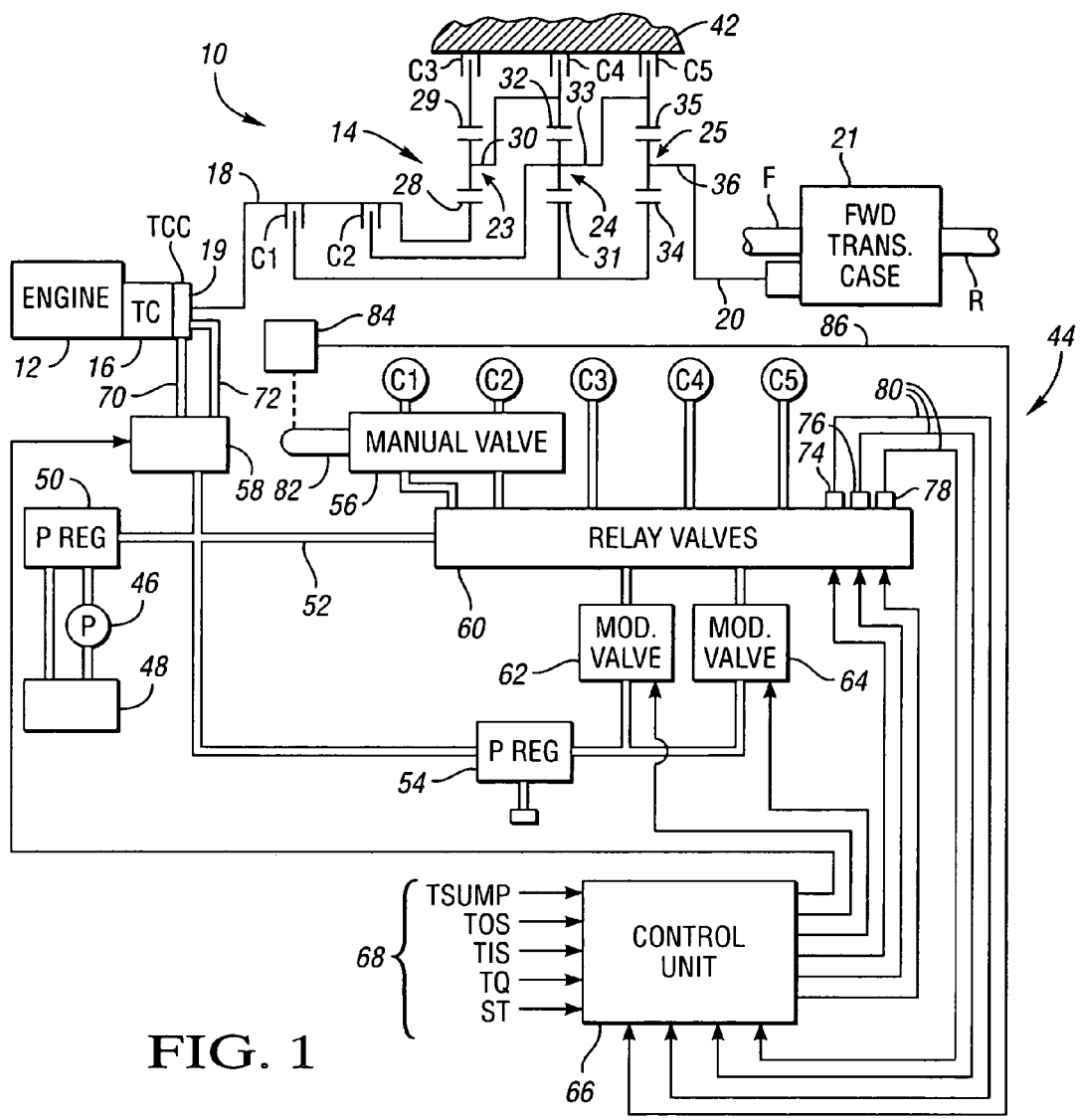
FIG. 1 is a schematic illustration of an automatic transmission.
FIG. 2 is a truth table indicating a relationship between transmission clutch activation and corresponding speed ratio.

Referring to FIG. 1, the reference numeral 10 generally designates a vehicle power train including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F, but any driven wheel configuration is within the scope of the present invention. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively.

As diagrammed in FIG. 2, the state of the clutches C1-C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1-C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58-64 based on a number of inputs 68 to achieve a desired transmission speed ratio. Such inputs include, for example, signals representing the transmission input speed TIS, a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1-C5 with only two modulated valves 62, 64. For any selected ratio, the control unit 66 activates a particular combination of relay valves 60 for coupling one of the modulated valves 62, 64 to the on-coming clutch, and the other one of the modulated valves 62, 64 to the off-going clutch.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1-C5 are responsive to the pressure commands via the valves 58-64 and their respective actuating elements (e.g., solenoids, current-controlled force motors).

As indicated above, each shift from one speed ratio to another includes a fill or preparation phase during which an apply chamber of the on-coming clutch is filled in preparation for torque transmission. Fluid supplied to the apply chamber compresses an internal return spring (not shown), thereby stroking a piston (not shown). Once the apply chamber is filled, the piston applies a force to the clutch plates, developing torque capacity beyond the initial return spring pressure. Thereafter, the clutch transmits torque in relation to the clutch pressure, and the shift can be completed using various control strategies. The usual control strategy involves commanding a maximum on-coming clutch pressure for an empirically determined fill time, and then proceeding with the subsequent phases of the shift. The volume of fluid required to fill an apply chamber and thereby cause the clutch to gain torque capacity is referred to as the "clutch volume."

If the predetermined fill time is too short, and the apply chamber is not filled sufficiently, the on-coming clutch does not have sufficient torque capacity when the off-going clutch is released, resulting in engine flare prior to the next phase of the shift; if the predetermined fill time is too long, the on-coming clutch will develop significant torque capacity before the off-going clutch is released, resulting in an early pull-down or a clutch overlap condition (i.e., a tie-up).

The controller 66 determines the timing of the pressure commands based on an estimated on-coming clutch volume, i.e., an estimated volume of fluid required to fill the on-coming clutch apply chamber and thereby cause the oncoming clutch to gain torque capacity. An estimated on-coming clutch volume must be used because the actual on-coming clutch volume may vary over time as a result of wear, and may vary from transmission to transmission because of build variations and tolerances.

The controller 66 calculates an estimated volume of fluid supplied to the on-coming clutch apply chamber as the chamber is being filled based on a mathematical model of the transmission hydraulic system, and compares the estimated volume of fluid supplied to the estimated clutch volume. When the estimated volume of fluid supplied to the apply chamber equals the estimated clutch volume, then the on-coming clutch should gain capacity. A hydraulic flow model for use in estimating the volume of fluid supplied to an apply chamber is described in U.S. Pat. No. 6,285,942, issued Sep. 4, 2001 to Steinmetz et al, which is hereby incorporated by reference in its entirety. The model inputs include the fill pressure, the shift type ST (for example, a 1-2 upshift), the speed of pump 46, and the temperature Tsump of the hydraulic fluid. The output of the model is the on-coming clutch flow rate. The flow rate is integrated by an integrator to form the estimated cumulative volume of fluid supplied to the apply chamber. In a preferred embodiment, the controller 66 subtracts the estimated volume of fluid supplied from the estimated clutch volume to determine an estimated clutch volume remaining. If the controller is accurate, the estimated clutch volume remaining will be zero at the time the on-coming clutch gains torque capacity.

The controller 66 is programmed to effect a clutch-to-clutch shift by lowering the torque on an off-going clutch to the point of allowing slip, and then closed loop controlling the off-going clutch to maintain a predetermined slip threshold. More specifically, during a shift event, the controller 66 generates an off-going clutch pressure command to which the off-going clutch's actuating elements are responsive to affect the off-going clutch pressure. The controller uses the input shaft speed signal TIS and the output shaft speed signal TOS to determine the amount of slip on the off-going clutch, and adjusts the magnitude of the off-going clutch pressure command to maintain the predetermined slip threshold, thereby effectuating the closed loop control.

During the shift event, the controller 66 also generates an on-coming clutch pressure command sufficient to cause the on-coming clutch to gain torque capacity during the closed loop control of the off-going clutch at the predetermined slip threshold. As the on-coming clutch gains torque capacity, it resists the rotation of the input shaft, causing a reduction in input shaft speed. The controller 66 detects the reduction in input shaft speed, and, because of the closed loop control of the off-going clutch, reduces the magnitude of the off-going clutch pressure command in an effort to maintain the predetermined slip threshold. As the on-coming clutch gains torque capacity, the magnitude of the off-going clutch pressure command becomes smaller until the off-going clutch has no torque capacity and the shift event is completed.

Figures 3, 4:
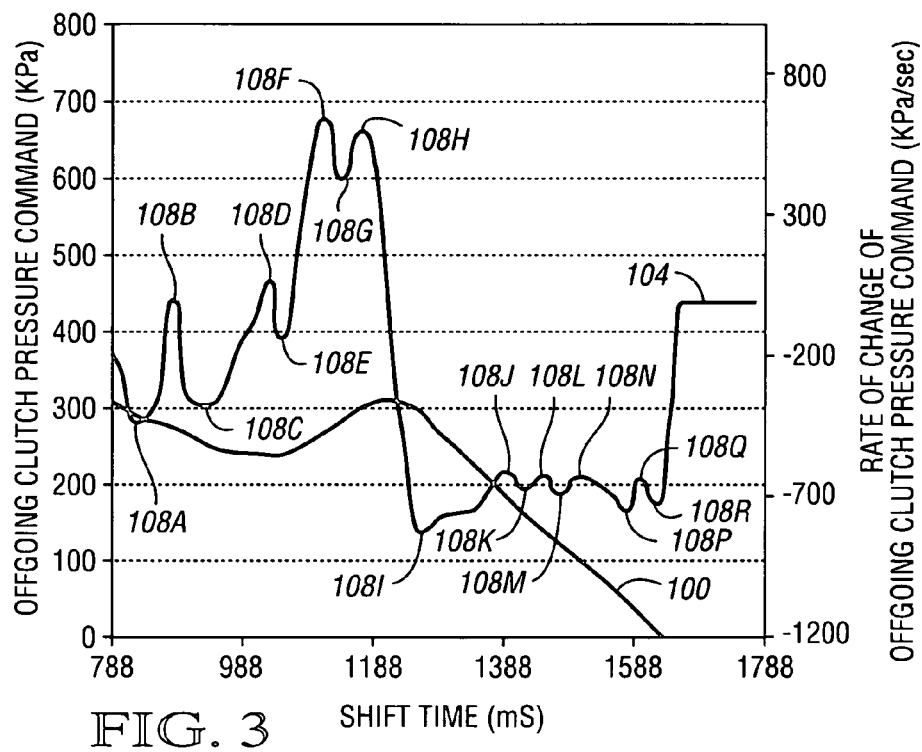
FIG. 3 is a graphical depiction of an off-going clutch pressure command and the first derivative with respect to time of the off-going clutch pressure command.
FIG. 4 is a schematic depiction of a buffer storing a set of data generated from the off-going clutch pressure command.

The off-going clutch pressure command is therefore responsive to the on-coming clutch gaining torque capacity, and thus may be advantageously analyzed to obtain information about the on-coming clutch. Referring to FIG. 3, the off-going clutch pressure command 100, as measured by the commanded off-going clutch fill pressure, is graphically depicted with respect to time during a shift event. The controller is programmed to determine the first derivative 104 with respect to time of the off-going clutch pressure command 100, and the second derivative (not shown) with respect to time of the off-going clutch pressure command 100. Local minima and maxima 108A-R of the first derivative 104 are found where the second derivative is equal to zero.

Each local minimum and maximum 108A-R is a data point comprising the time value at which the local minimum or maximum occurred and the corresponding value of the first derivative. The controller is programmed to generate a set of data containing the data points 108A-R for each local minimum and maximum, and a corresponding estimated clutch volume remaining for each of the data points. The data is stored in a buffer 110, as shown in FIG. 4.

The closed loop control of the off-going clutch results in a reduction in magnitude of the off-going clutch pressure command when the on-coming clutch gains torque capacity. Accordingly, the first derivative will change from a positive value to a negative value, or from a negative value to a more negative value, when the on-coming clutch gains torque capacity. Thus, data points with a time value earlier than a negative to positive transition in the first derivative are discarded or ignored. In FIGS. 3 and 4, the first derivative at local minimum 108E is negative, and first derivative at local maximum 108F is positive. Accordingly, all data points associated with local minima and maxima occurring prior to 108F are ignored or discarded.

Figure 5:
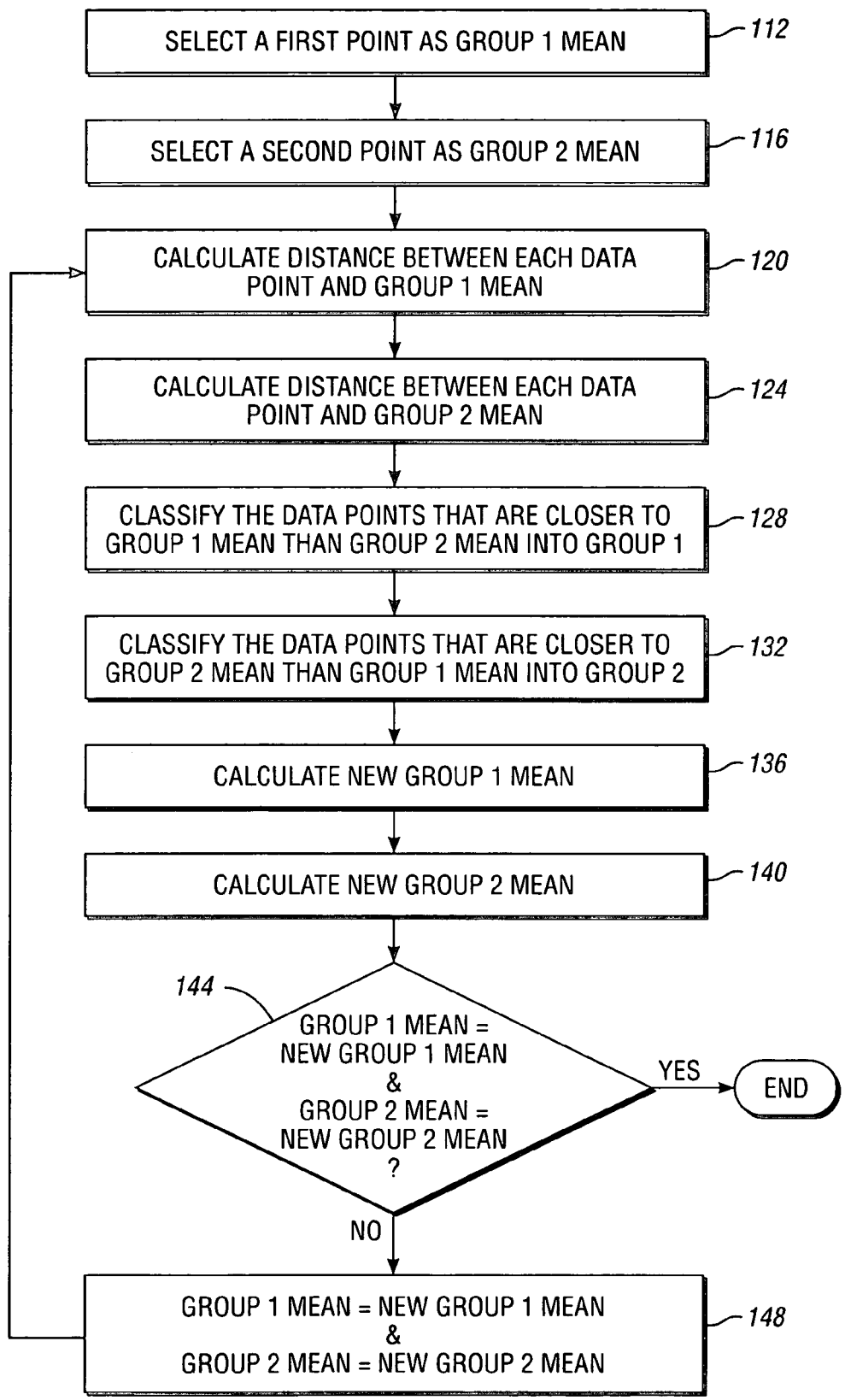
FIG. 5 is a block diagram illustrating a k-means neural network algorithm for processing the data in the buffer of FIG. 4.

The controller then performs a k-means neural network algorithm to assign each of the data points 108F-108R into one of two clusters or groups, where one group, "Group 1," consists of those local minima and maxima that occur before on-coming clutch torque capacity, and where the other group, "Group 2," consists of those local minima and maxima that occur after on-coming clutch torque capacity. The k-means neural network method employed by the controller is depicted in the flow chart of FIG. 5. The method includes selecting a first data point to function as an initial Group 1 Mean (step 112). In the preferred embodiment, the controller selects the data point 108F having the earliest time value of all the remaining data points in the buffer as the initial Group 1 Mean. The method also includes selecting a second data point to function as an initial Group 2 Mean (step 116). In the preferred embodiment, the controller selects the data point 108R having the latest time value of all the data points in the buffer as the initial Group 2 Mean.

The method also includes calculating, for each data point 108F-R in the buffer, the distance between the data point and the Group 1 Mean (step 120). The method also includes calculating, for each data point 108F-R in the buffer, the distance between the data point and the Group 2 Mean (step 124). The distance between a data point and a mean may be the Euclidean distance from the data point to the mean. That is, $$D = \sqrt{(M_m - M_{DP})^2 + (t_m - t_{DP})^2}$$

Where D is the distance between the mean and the data point, $M_m$ is the value of the first derivative at the mean, $M_{DP}$ is the value of the first derivative at the data point, $t_m$ is the time value at the mean, and $t_{DP}$ is the time value at the data point. Alternatively, the distance may be non time based, where the distance is simply the difference between the first derivative value of the data point and the first derivative value of the mean.

The method further includes classifying the data points that are closer to the Group 1 Mean than the Group 2 Mean into Group 1 (step 128), and classifying the data points that are closer to the Group 2 Mean than the Group 1 Mean into Group 2 (step 132). Using the data points in Group 1, a New Group 1 Mean is calculated (step 136). If the distances calculated in steps 120 and 124 are Euclidean distances, then the New Group 1 Mean will comprise the mean first derivative value and the mean time value of all the data points classified as Group 1. If the distances calculated are non time based, i.e., the difference between a data point's first derivative value and the mean's first derivative value, then the New Group 1 Mean will comprise the mean first derivative value of all points classified as Group 1. Similarly, using the data points in Group 2, a New Group 2 Mean is calculated (step 140).

In decision block 144, the controller determines whether the Group 1 Mean is equal to the New Group 1 Mean, and whether the Group 2 Mean is equal to the New Group 2 Mean. If not, then the controller designates the New Group 1 Mean as the Group 1 Mean, designates the New Group 2 Mean as the Group 2 Mean (step 148), and then repeats the clustering process at step 120. If so, the k-means neural network algorithm is successfully completed.

After the controller has processed the data in the buffer according to the k-means neural network algorithm, the controller determines the data point 108I in the second group having the earliest time value. Data point 108I is considered the point at which the on-coming clutch gained capacity, and, accordingly, the point at which the on-coming clutch's apply chamber is completely filled. The estimated volume remaining associated with point 108I should be zero, that is, the estimated volume of fluid supplied to the on-coming clutch apply chamber should be equal to the estimated clutch volume. If the estimated volume remaining associated with point 108I is not zero, then the controller can adapt its volume remaining calculations accordingly. For example, referring again to FIG. 4, the estimated clutch volume remaining at data point 108I is −20 cc. The controller may increase the estimated clutch volume accordingly since the estimated volume of fluid supplied exceeds the estimated clutch volume by 20 cc.

While the best mode for carrying out the invention has been described in detail, those familiar with the art to which this invention relates will recognize various alternative designs and embodiments for practicing the invention within the scope of the appended claims.

The invention claimed is:

1. A method for use with an automatic transmission having an off-going clutch and an on-coming clutch during a speed ratio shift event, the method comprising:
   controlling the off-going clutch using closed loop control to maintain a predetermined slip threshold, said controlling the off-going clutch including generating an off-going clutch pressure command to which the off-going clutch is responsive and that varies with respect to time;
   causing the on-coming clutch to gain torque capacity during said controlling the off-going clutch;
   determining the first derivative with respect to time of at least a portion of the off-going clutch pressure command; and
   determining when the on-coming clutch gained torque capacity using the first derivative.

2. The method of claim 1, wherein said determining when the on-coming clutch gained torque capacity includes using a neural network method.

3. The method of claim 2, wherein said first derivative is characterized by local minima and maxima, and wherein said determining when the on-coming clutch gained torque capacity includes generating a set of data points, each of the data points including a time value and a first derivative value of one of the local minima or maxima.

4. The method of claim 3, further comprising
   classifying each of the data points into one of a first group and a second group using a k-means algorithm, the data points in the second group having later time values than the data points in the first group; and
   determining the data point having the earliest time value in the second group.

5. The method of claim 4, wherein the on-coming clutch includes an apply chamber, wherein the on-coming clutch is hydraulically actuated by filling the apply chamber with fluid, wherein said causing the on-coming clutch to gain torque capacity includes supplying fluid to the apply chamber, and wherein the method further includes determining a measure of the total volume of fluid supplied to the apply chamber at the time value of the data point having the earliest time value in the second group.

6. A control apparatus for an automatic transmission having an input shaft and an output shaft; a first clutch and a second clutch; a first and second fill chamber to which hydraulic fluid is supplied for hydraulic actuation of the first and second clutch, respectively; a first and second actuator configured to selectively allow pressurized fluid into the first and second fill chamber, respectively; wherein the first clutch and the second clutch are operatively connected between the input shaft and the output shaft to effect a speed ratio change during a shift event by disengagement of the first clutch and engagement of the second clutch, the control apparatus comprising:
   a controller operatively connected to the first actuator and the second actuator to cause selective disengagement and engagement of the first and second clutches, respectively;
   wherein the controller is programmed and configured to determine the speed ratio between the input shaft and the output shaft in order to determine the existence of a predetermined slip threshold at the first clutch;
   wherein the controller is programmed and configured to control the off-going clutch during the shift event using closed loop control to maintain the predetermined slip threshold by generating an off-going clutch pressure command to which the first clutch is responsive and that varies with respect to time;
   wherein the controller is programmed and configured to cause the on-coming clutch to gain torque capacity during the shift event;
   wherein the controller is programmed and configured to determine the first derivative with respect to time of at least a portion of the off-going clutch pressure command; and
   wherein the controller is programmed and configured to determine when the on-coming clutch gained torque capacity using the first derivative.

7. The control apparatus of claim 6, wherein the controller is programmed and configured to employ a neural network method to determine when the on-coming clutch gained torque capacity using the first derivative.

8. The control apparatus of claim 7, wherein said first derivative is characterized by local minima and maxima, and wherein the controller is programmed and configured to generate a set of data points, each of the data points including a time value and a first derivative value of one of the local minima or maxima.

9. The control apparatus of claim 8, wherein the controller is programmed and configured to classify each of the data points into one of a first group and a second group using a k-means algorithm, the data points in the second group having later time values than the data points in the first group, and wherein the controller is programmed and configured to determine the data point having the earliest time value in the second group.

10. The control apparatus of claim 9, wherein the controller is programmed and configured to determine a measure of the total volume of fluid supplied to the apply chamber at the data point having the earliest time value in the second group.

11. A method for use with an automatic transmission having an off-going clutch and an on-coming clutch during a speed ratio shift event, the on-coming clutch being characterized by hydraulic actuation when an apply chamber is filled with sufficiently pressurized fluid, the method comprising:

controlling the off-going clutch using closed loop control to maintain a predetermined slip threshold, said controlling the off-going clutch including generating an off-going clutch pressure command to which the off-going clutch is responsive and that varies with respect to time;

causing the on-coming clutch to gain torque capacity by supplying fluid to the apply chamber during said controlling the off-going clutch;

determining the first derivative with respect to time of at least a portion of the off-going clutch pressure command, said first derivative being characterized by local minima and maxima;

generating a set of data points, each of the data points including a time value and a first derivative value of one of the local minima or maxima;

classifying each of the data points into one of a first group and a second group using a k-means algorithm, the data points in the second group having later time values than the data points in the first group;

determining the data point having the earliest time value in the second group; and determining a measure of the total volume of fluid supplied to the apply chamber at the data point having the earliest time value in the second group.

* * * * *